United States Patent Office 3,033,807
Patented May 8, 1962

3,033,807
MULTI-COLORED ORGANOPOLYSILOXANES
Barbara F. Krueckel, 18612 Pacific Coast Highway, Malibu, Calif.
No Drawing. Filed Mar. 28, 1961, Ser. No. 98,781
23 Claims. (Cl. 260—18)

This invention is concerned with the multi-coloration of silicone products, such as, the fillerless gums, silica-filled rubbers, the colorless, unreinforced resins, glass cloth-, fiber-, and silica-reinforced resins, and various colorless fluids.

More particularly, the invention relates to a multi-coloring technique for organopolysiloxane compositions convertible to the cured, solid, elastic (elastomer) or rigid (resin) state, the compositions comprising (a) fluid organopolysiloxanes having an average of about 1 to 2.05 organic groups per silicon atom, both of high or low molecular weight and both linear or cyclic, (b) the halogen iodine as a flexible preliminary colorant and (c) one or more metallic salts of an organic carboxylic acid.

In the past due to the relative lack of compatibility of silicone compounds with dyestuffs or any other compounds that might be classed as colorants, the coloration of silicones has either been ignored for the most part or at least has existed only as a mechanical by-product of a "strengthening" device in the form of fillers. In the case of silicone rubbers these fillers are restricted to a half-dozen or so, such as titanium dioxide, calcium oxide, or ferric oxide, unavoidably resulting in either an opaque white or orange color. This requires tedious compounding and special milling equipment necessary for an even suspension of the minute particles. On the other hand, mechanical coloring of resins has been obtained chiefly by the addition of aluminum particles, carbon black, or paint pigments, all of which present the problem of precipitation and re-mixing just before use. Up until this invention there has been no chemically-reactive, non-particulate coloring technique for organopolysiloxanes, and certainly there has been no device even in the use of fillers which encompasses the entire range of the spectrum and which not only enables polymerization at normal cure-times but also affords an end product without impairment of optimum strength or other desirable physical characteristics of the particular organopolysiloxane.

With the stepwise introduction of silicone products only a decade along and with their industrial and scientific exploitation limits barely touched upon, coloration of organopolysiloxanes has not been a crucial factor in practical usage. In consideration of today's exponential rise in the marketing need for these products, however, any multi-coloring of this type of material enabling a competitively simple and inexpensive process could conceivably prove invaluable not only in the electronic field of color-coding silicone rubber extrusion, wire, and cable and silicone resin insulation and coating but also in the field of consumer products involving aesthetic appeal wherein resin enamels are already playing a great part.

In this light, it has been discovered that a colorant for organopolysiloxanes embracing the above requirements is the purplish-black crystal of the halogen iodine. It has been known that the four halogens constitute one class of a small family of non-metallic, inorganic materials compatible with organopolysiloxanes and are used, in fact, in the intermediate steps of manufacture. Iodine, for one, however, has given way to chlorine and bromine in this respect and as such has been neglected. Coloring qualities of any of the halogens in conjunction with organopolysiloxanes is thought to be heretofore unknown. Thus, the present invention dramatically incorporates only one substance as a preliminary key which may be turned in any direction on the color chart depending upon the color desired by nothing more than a highly-effective class of catalyst. Where silica fillers or glass cloth and fiber reinforcement are used, the colors, though diluted, are still outstanding.

In obviating a filler as a colorant (when not needed for other properties), this coloring invention will prove advantageous over and above eliminating expenditure of materials, special equipment, and extra time. It may lead to an innovation in regard to the "blue-sky" field of rockets, missiles, and high-flying aircraft, where consideration of mass is an important factor and where color-coded silicones might be extremely advantageous, by eliminating the extra bulk and weight of any coloring filler.

In the specification and claims for brevity, the convertible organopolysiloxanes, which may be viscous or fluid masses or gummy solids, depending on the state of condensation, will hereinafter be referred to as "convertible organopolysiloxanes."

The convertible organopolysiloxanes which are useable in this invention include all those well known in the art and may be described by the average general formula $$R_nSiO_{\frac{4-n}{2}}$$

where R can be any monovalent-hydrocarbon radical or any halogenated monovalent hydrocarbon radical, to include alkyl radicals such as methyl, ethyl and octadecyl; aryl radicals such as phenyl and anthracyl; alkaryl radicals such as tolyl, xylyl, and methyl naphthyl; aralkyl radicals such as benzyl and phenylethyl; cycloaliphatic radicals such as cyclohexyl and cyclopentyl; alkenyl radicals such as vinyl and allyl; and halogenated monovalent hydrocarbon radicals such as chloromethyl, difluorophenyl, bromophenylethyl, trifluorovinyl and a,a,a-trifluoromethylphenyl and where $n$ is from about 1 to about 2.05. These siloxanes can be either homopolymeric or copolymeric materials containing two or more different types of siloxane units. Organic radicals attached to any one silicon atom can be the same or the radicals attached to any one silicon atom can be different.

Organopolysiloxanes correspond to the general formula $$(R'R''SiO)_n$$

where R' and R" may or may not be the same and where they may be halogens, hydroxy or aloxy groups, or organic radicals selected from the class consisting of alkyls, aryls, alkaryls, aralkyls, haloaryls, alkenyls, and where $n$ is an integer of at least 2, e.g., from 2 to 100 or more.

Typical of the elastomers are the classical, straight-chained members of high molecular weight (up to 500,000 and over) often described as the $(MD_xM)$ series, where (M) refers to the monofunctional unit or end group and (D) refers to the difunctional or intermediate unit with silicon-bonded organic groups, such as a polymethylsiloxane having the formula $$CH_3-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_n\underset{\underset{CH_3}{|}}{\overset{\overset{CH_3}{|}}{Si}}-CH_3$$

where $n$ is 50, more or less. In the case of room temperature-curing elastomers, the organopolysiloxane contains many hydroxy end groups and corresponds to the general silanol formula $$HO-\left[\underset{\underset{R''}{|}}{\overset{\overset{R'}{|}}{Si}}-O\right]_n H$$

where R' and R" have the meanings listed above, and $n$ is again 50, more or less.

Where an organopolysiloxane resin is used, it ordinarily contains a high proportion of (T) or trifunctional units, wherein intermediate silicon atoms are bonded to 3 oxygen atoms as well as an organic group, in addition to appreciable concentration of hydroxy groups attached to the silicon (silanols).

The iodine component is employed specifically as a preliminary color factor and may be introduced either in its free elemental state or in any other form, such as its alcohols, etc.

In introducing the iodine into the convertible polysiloxane it may be necessary and desirable to disperse the iodine in a solvent mutually compatible with the organopolysiloxane.

The preferred dispersants are the short chain organopolysiloxanes themselves. For instance, the straight chain polysiloxanes from the ($MD_xM$) referred to above where $x$ is 2 through 9 may be used. Members of the cyclic ($D_x$) series of polysiloxanes, such as cyclic methylsiloxane tetramer, octamethylcyclotetrasiloxane, are also quite satisfactory.

By proceeding in this manner rather than dispersing the iodine or iodine compound directly into the more viscous organopolysiloxanes enables quicker dissolving and mixing, eliminating the necessity for any filtration.

For organopolysiloxanes curable at room temperatures, an organic silicate cocatalyst is generally used with the metallic salts described above. A full description of this type of condensible siloxane and the appropriate methods of preparation can be found in U.S. Patent No. 2,843,555. This type of condensible organopolysiloxane composition may be fully employed in the present invention to produce a colored room temperature cured organopolysiloxane. The silicates which may be used correspond to the general formula

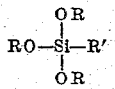

where R and R' may be an alkyl, or halo alkyl and, in addition, R' may be aloxy, aryl, etc., or halogenated derivatives of these groups attached to the silicon atom through the medium of oxygenation in accordance with the description in U.S. Patent 2,843,555. Polyethyl silicate having the formula $(C_2H_5O)_4Si$ is the preferred catalyst.

The metallic salts of organic carboxylic acids used as final color determinants as well as catalytic agents, which may be used singly or in combination include those described in the above-mentioned U.S. Patent 2,843,555 and in U.S. Patent No. 2,449,572. Namely, suitable acid radicals are the resinate, fatty acid radicals such as linolate, stearate, oleate, or the lower alkyl and alkenyl acid radicals such as acetate, butyrate, octoate, etc. The choice of the acid radical is governed by its solubility in the particular organosiloxane. The metal ion of the metallic salt is one selected from the class consisting of tin, iron, manganese, cobalt, antimony, titanium, cadmium, bismuth, lead, zinc, calcium, barium, potassium, sodium, magnesium, vanadium, strontium, cerium, thorium, chromium, copper, aluminum, nickel, mercury and zirconium. The salts most preferred are dibutyl tin dilaurate, tin octoate, iron napthenate, cobalt octoate, and manganese naphthenate, all of which are soluble in organopolysiloxane elastomers and resins. These examples are not meant to be restrictive. Other metallic salts from the class above offer unlimited possibilities as colorants.

In a more specific embodiment this invention comprises as the first step in the coloring technique the addition of iodine crystals to a silicone fluid. The iodine crystals are readily soluble in the cyclic methylsiloxane tetramer octamethylcyclotetrasiloxane described above to be adequate for coloring in an amount of from 1 to 10 percent of the fluid by weight. The resultant solution has a clear, dark magenta color which varies in intensity with the degree of saturation. The solution is readily obtained by either letting stand at room temperature or by stirring for a minute or two. The portion of iodine crystals not going into solution remain on the bottom of the silicone dispersant enabling a simple decanting of the solution, which in turn is then added to the condensible elastomer or resin. As only a small amount of iodine-fluid is required to impart good color, it is not necessary to stir in more than 5 percent by weight to the condensible organopolysiloxane. (The end-product hardness is not affected by the addition of so small an amount of fluid.) This mixture is a particle-free and uniform magenta.

The metal ion in the form of one or more metallic salts is finally added from 0.1 to 5 percent of the weight of the condensible organopolysiloxane, depending upon which combination of metallic salts is used as final colorants, a not-too critical factor, and again depending upon the type of convertible organopolysiloxane.

If an alkyl silicate cocatalyst solution is desired, it may be added to the convertible organopolysiloxane either before or after the iodine. A solution of 0.1 to 5 percent or more, based on the weight as well as the type of convertible organopolysiloxane, is adequate for final polymerization of the room temperature vulcanizing organopolysiloxanes.

When room temperature vulcanizing polysiloxanes are used, in accordance with U.S. Patent 2,843,555, it is advantageous to use a weight ratio between the alkyl silicate and the metallic salts generally corresponding, by weight, from 0.1 to 3 parts of the metallic salt per part of the alkyl silicate.

In order that those skilled in the art may better understand how the present invention may be practiced, the following examples are given by way of illustration and not by way of limitation. All parts are by weight.

EXAMPLE 1

To 100 parts of the colorless, cyclic fluid, octamethylcyclotetrasiloxane, manufactured by General Electric Company, New York, under the name $D_4$, 5 parts of iodine crystals, sold as the analytical reagent by Mallinckrodt Chemical Works, Los Angeles, California, were added. The purplish-black crystals dissolved immediately, and the magenta supernatant was decanted. To 100 parts of a room temperature-vulcanizing polymethylsilanol also manufactured by General Electric Company and used as the gum base for its RTV 40, 60, etc., rubber compounds, were added 2 parts of a polyethyl silicate sold by Carbide and Carbon Chemicals Corporation, New York, N.Y., under the name Ethyl Silicate 40, 5 parts of the iodine-fluid mixture, and 1 part dibutyl tin dilaurate, a colorless solution containing 12 percent tin, sold by Metal and Thermit Company, El Segundo, California, under the name Thermolite 12, which turned the mixture from magenta to a true, bright, transparent red. Cure-time was approximately one-half hour at room temperature, and the final product was indistinguishable as to elastic, solid state, from a similarly-catalyzed control minus the iodine-fluid component. There was no fading of color in time or under heat (60° C.) application.

EXAMPLE 2

A composition was prepared exactly as set forth in Example 1 and immediately after addition of the dibutyl tin dilaurate, 1 part tin octoate, a colorless solution containing 28 percent tin, sold by Nuodex, Los Angeles, California, under the name tin octoate was added to the composition. The red color quickly turned to orange and then a final bright, opaque yellow. Cure-time was a few minutes.

EXAMPLE 3

The procedure of Examples 1 and 2 was carried out except for reversal of the order of addition of the metallic salts. That is, the 1 part tin octoate was added to the condensible organosiloxane-iodine mixture before addition of the 1 part dibutyl tin dilaurate. The tin octoate changed the color of the mixture from magenta to yellow. The final addition of the dibutyl tin dilaurate turned this mixture to a creamy translucent white.

EXAMPLE 4

For brevity Table I is presented to demonstrate examples of some of the colors obtainable using the same proportions of iodine-fluid, ethyl silicate, and room temperature-cure gum base, or as an alternative, a colorless, fluid polysiloxanol resin manufactured by General Electric Company. The polysiloxanol resin furnished by G.E. contains ethylsilicate to allow low temperature curing. The resin was used in the same proportion by weight as the gum. The only variants as to component parts by weight are the metallic salts tin octoate, dibutyl tin dilaurate, and the following, also sold by Nuodex, iron naphthenate, manganese naphthenate, and cobalt octoate, all containing 6 percent metal ion. The above octoates were salts of 2-ethyl hexnoic acid. When more than one of the metallic salts were added, their total concentration approximated 3 parts by weight of the polymethylsilanol, and their individual concentrations were prorated evenly. Any accenting of the relative proportion of a metallic salt serves to shade the final color one way or another with a corresponding shift in cure-time.

As indicated above, the order in which specific metallic salts are added is important. If the same constituents are reversed in order, resultant colors are more often different rather than being reversible. All mixtures polymerized to the solid state with varying cure-times, which ranged from a few minutes to 24 hours.

It should be noted that manganese naphthenate and cobalt octoate were used for color influence and always in conjunction with one or more of the other catalysts, having little or no catalytic effect when used by themselves in polymerizing the particular polymethylsilanols employed as examples. It is also called to attention that whereas the tin salts were colorless, the iron, cobalt, and manganese were colored brown, blue, and red-brown, respectively. These, however, in the concentrations used could impart no color value whatsoever in any mechanical sense. The color changes had to be of a chemical nature.

Alternating the order of addition of the metallic salts in Table I presents interesting if not delightful variations in shade such as blue-green, black-green, lavender, apricot, etc. It should again be stressed that Table I represents only a small portion of the available combinations of metallic salts taken from the abovementioned class.

It should be noted that, although the metallic salts generally have a catalytic effect upon the vulcanization of the condensible organopolysiloxanes, this is not a critical factor in their coloring action. Any of the well known catalysts, may be used to effect or assist in the final condensation or vulcanization.

For example, any of the above-mentioned organic silicates and/or the organoperoxide curing agents (0.1 to 8% by weight) are suitable. If required for curing of the particular organosiloxane with the particular catalysts, the colored mixtures may be heated to effect vulcanization.

While the invention has been described in connection with different embodiments thereof, it will be understood that it is capable of further modification, and this application is intended to cover any variations, uses, or adaptations of the invention following, in general, the principles of the invention and including such departures from the present disclosure as come within knowing, or customary practice in the art to which the invention pertains and as may be applied to the essential features hereinbefore set forth and fall within the scope of the invention or the appended claims.

Having thus described my invention what I claim is:

1. A composition useful in preparing colored, solid organopolysiloxane elastomers or resins which comprises a condensible organopolysiloxane having from about 1 to about 2.05 hydrocarbon groups per silicon atom, a small amount of at least one metallic salt of an organic acid soluble in said organopolysiloxane and a small amount of iodine.

2. A composition as in claim 1 and including a plurality of metallic salts of organic acids soluble in said organopolysiloxane.

3. A composition as in claim 1 wherein the metal salt is present in an amount up to 1% based on the weight of the organopolysiloxane.

4. A composition as in claim 1 wherein the metallic ion of said metallic salt is an ion of a metal selected from the group consisting of tin, iron, manganese, cobalt, antimony, titanium, cadmium, bismuth, lead, zinc, calcium, barium, potassium, sodium, magnesium, vanadium, strontium, cerium, thorium, chromium, copper, aluminum, nickel, mercury and zirconium.

5. A composition as in claim 1 wherein the iodine is present in an amount up to 0.25% by weight based on the organopolysiloxane.

*Table I*

| Sample No. | Color | Metal[1] | Color | Metal | Color | Metal | Color | Metal | Color |
|---|---|---|---|---|---|---|---|---|---|
| 1 | magenta | Sn-12 | red | | | | | | |
| 2 | do | Sn-12 | do | Sn | yellow | | | | |
| 3 | do | Sn-12 | do | Sn | do | Co | green | | |
| 4 | do | Sn-12 | do | Fe | brown (Light) | | | | |
| 5 | do | Sn-12 | do | Co | purple | | | | |
| 6 | do | Sn-12 | do | Co | do | Fe | black | | |
| 7 | do | Sn-12 | do | Mn | orange | | | | |
| 8 | do | Sn-12 | do | Mn | do | Fe | tan | | |
| 9 | do | Mn | rose | | | | | | |
| 10 | do | Mn | do | Co | grey (light) | | | | |
| 11 | do | Mn | do | Co | do | Sn | pink | | |
| 12 | do | Mn | do | Co | do | Sn | pink | Fe | grey (dark) |
| 13 | do | Fe | brown (dark) | | | | | | |
| 14 | do | Co | blue | Sn-12 | blue | | | | |
| 15 | do | Sn | yellow | Sn-12 | cream | | | | |

[1] The following abbreviations are used:
Sn-12 for dibutyl tin dilaurate
Sn for tin octoate
Co for cobalt octoate
Fe for iron naphthenate
Mn for manganese naphthenate 6. A composition as in claim 1 wherein the organic acid radical of the metallic salt is a radical selected from the group consisting of resinate, naphthenate, fatty acid radicals, and lower alkyl and alkenyl carboxylic acid radicals.

7. A composition curable to a solid state which comprises a condensible organopolysiloxane having from about 1 to about 2.05 hydrocarbon groups per silicon atom, a small amount of at least one metallic salt of an organic acid soluble in said organopolysiloxane, a small amount of iodine and an amount of an organopolysiloxane curing agent sufficient to cure the composition to the solid state.

8. The colored product obtained by curing the composition of claim 7.

9. A composition as in claim 7 wherein the metal salt is present in an amount up to 1% based on the weight of the organopolysiloxane.

10. A composition as in claim 7 wherein the metallic ion of said metallic salt is an ion of a metal selected from the group consisting of tin, iron, manganese, cobalt, antimony, titanium, cadmium, bismuth, lead, zinc, calcium, barium, potassium, sodium, magnesium, vanadium, strontium, cerium, thorium, chromium, copper, aluminum, nickel, mercury and zirconium.

11. A composition as in claim 7 wherein the iodine is present in an amount up to 0.25% by weight based on the organopolysiloxane.

12. A composition as in claim 7 wherein the organic acid radical of the metallic salt is a radical selected from the group consisting of resinate, naphthenate, fatty acid radicals and lower alkyl and alkenyl carboxylic acid radicals.

13. A composition as in claim 7 wherein said curing catalyst comprises at least 0.1% by weight based on the organopolysiloxane of a peroxide curing agent and said composition is curable by heating.

14. A composition as in claim 7 and including a plurality of metallic salts of organic acids soluble in said organopolysiloxane.

15. The colored product obtained by curing the composition of claim 13.

16. A composition curable to the solid state at room temperature which comprises an organopolysiloxane selected from the group consisting of the $MD_xM$ series, where M is a hydroxyl group, D is a silicon atom having approximately 2 hydrocarbon groups attached thereto and $x$ is an integer greater than 1, and organopolysiloxane resins having a high proportion of silicon atoms attached to 3 oxygen atoms and one hydrocarbon group and having an appreciable number of hydroxyl groups attached to silicon atoms; a metallic salt of a monocarboxylic acid, wherein the metal is selected from the group consisting of iron, tin, manganese, cobalt, antimony, titanium, cadmium, bismuth, lead, zinc, calcium, barium, potassium, sodium, magnesium, vanadium, strontium, cerium, thorium, chromium, copper, aluminum, nickel and zirconium, said metallic salt being soluble in said organopolysiloxane; a small amount of iodine; and a sufficient amount of an organosilicon compound selected from the class consisting of (1) alkylsilicates having the formula

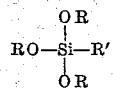

where R and R' are members selected from the class consisting of alkyl groups and halogen-substituted alkyl groups and R', in addition, represents a member selected from the class consisting of aryl, aralkyl, alkaryl, alkoxy, aryloxy and halogenated derivatives of the aforementioned groups, and (2) partial hydrolysis products of the aforementioned alkylsilicates, to render the composition room-temperature curable.

17. The process of coloring condensible organopolysiloxanes which comprises incorporating in the organopolysiloxane a small amount of iodine and a small amount of a metallic salt of an organic acid soluble in the organopolysiloxane.

18. A process as in claim 14 and including the subsequent steps of incorporating a small amount of at least one other metallic salt of organic acids soluble in the organopolysiloxane, whereby the color of the composition is modified by each subsequently added salt.

19. A process as in claim 14 in which the order of addition of said salts is changed thereby modifying the color of the composition.

20. A process as in claim 14 wherein the iodine is incorporated into the organopolysiloxane by the steps of (1) dispersing the iodine in a solvent soluble in the organopolysiloxane and (2) mixing the organopolysiloxane with a small amount of the solution prepared in step (1).

21. A process as in claim 17 wherein the solvent is a solvent selected from the group consisting of organopolysiloxanes of the $(MD_xM)$ series where M is a hydroxyl group, D is a silicon atom having approximately 2 hydrocarbon groups attached thereto and $x$ is an integer of 2 through 9 and fluid cyclic organopolysiloxanes.

22. A process as in claim 14 and including the additional steps of adding a condensing catalyst and heating the composition a sufficient amount to condense it to the solid state.

23. A process as in claim 14 wherein the metallic ion of said metallic salt is an ion of a metal selected from the group consisting of tin, iron, manganese, cobalt, antimony, titanium, cadmium, bismuth, lead, zinc, calcium, barium, potassium, sodium, magnesium, vanadium, strontium, cerium, thorium, chromium, copper, aluminum, nickel, mercury and zirconium.

References Cited in the file of this patent
FOREIGN PATENTS
1,177,327    France _____ Dec. 1, 1958